United States Patent Office 3,547,864
Patented Dec. 15, 1970

3,547,864
STEREOSPECIFIC POLYMERIZATION OF CONJUGATED DIOLEFINS IN THE PRESENCE OF HALOGEN SUBSTITUTED DIOLEFINS
Evalds Lasis, Sarnia, Ontario, Canada, assignor to Polymer Corporation Limited, Sarnia, Ontario, Canada, a body corporate and politic
No Drawing. Filed June 27, 1968, Ser. No. 740,485
Claims priority, application Canada, Aug. 18, 1967, 998,131
Int. Cl. C08d 3/06, 3/10
U.S. Cl. 260—94.3                                    9 Claims

ABSTRACT OF THE DISCLOSURE

In a stereoregular polymerization of a vinyl monomer such as an aliphatic conjugated diolefin by a catalyst comprising a hydrocarbyl aluminum compound and a compound of a heavy metal of Group IV–B to VI–B, an improvement in control of molecular weight is found by employing a halogen-substituted diolefin, e.g. chloroprene, in an amount of less than 2 moles per 100 moles of said vinyl monomer.

---

This invention relates to the polymerization of unsaturated hydrocarbons in the presence of Ziegler type catalyst. In particular, it relates to a process of controlling the molecular weight of polymers in the stereospecific polymerization of conjugated diolefins.

Various modifiers of the molecular weight of polymers have been proposed for the solution polymerization of hydrocarbon monomers. One example of the modifiers that may be effectively used in the polymerization of ethylene, propylene or a mixture of both is hydrogen, and yet there are difficulties associated with its use. Being a gas, which is sparingly soluble in organic solvents at low pressures, it does not readily disperse in viscous polymer solutions as required for the production of uniformly and reproducibly modified polymers. It is also known that metal organic compounds such as diethyl zinc or diethyl cadmium depress the molecular weight of polyolefins, polydiolefins or copolymers of mono- and/or diolefins. These metal organic compounds, however, are not always effective and have a detrimental effect on the stereoregularity of the resulting polymers.

The object of this invention is to provide an improved process of producing stereoregular hydrocarbon polymers of controlled molecular weight in the presence of Ziegler catalyst. Another object is to provide a novel polymerization catalyst capable of producing stereoregular polymers of controlled molecular weight.

The invention is based on the discovery that the addition of a small amount of a halogen substituted diolefin such as chloroprene reduces the molecular weight of stereoregular polymer of a conjugated diolefin produced in the presence of coordination catalysts formed by mixing trihydrocarbyl aluminum and a vanadium compound.

In accordance with this invention, a process is provided for polymerizing a hydrocarbon monomer containing at least one vinyl group to produce a stereoregular polymer having a molecular weight corresponding to an intrinsic viscosity of less than 10 deciliter/gram, measured in toluene at 30° C., which process comprises contacting said monomer with a catalyst comprising a hydrocarbyl aluminum compound and a compound of a heavy metal of Group IV–B to VI–B of the Periodic Table in the presence of less than 2 moles per 100 moles of said monomer of a halogen substituted diolefin containing 4–12 carbon atoms.

In one of the specific embodiments of the invention, a process is provided for polymerizing a conjugated diolefin selected from butadiene or isoprene to produce a stereoregular trans-1,4 polymer having a molecular weight corresponding to an intrinsic viscosity from about 0.5 to 5 dl./gm., measured in toluene at 30° C., which process comprises contacting said diolefin with a catalyst comprising a trialkyl aluminum and a vanadium compound, in the presence of about 0.1 to 1.0 mole of chloroprene per 100 moles of said diolefin.

The invention also provides a catalyst for the polymerization of a hydrocarbon monomer containing at least one vinyl group to produce a stereoregular polymer having a molecular weight corresponding to an intrinsic viscosity of less than 10 deciliters/gram, measured at 30° C. in toluene, which comprises a mixture of a hydrocarbyl aluminum compound and a compound of a heavy metal of Group IV–B to VI–B of the Periodic Table with a halogen substituted diolefin containing 4–12 carbon atoms, said halogen diolefin being present in an amount less than the sum of said aluminum compound and said heavy metal compound, on a molar basis.

The hydrocarbon monomer which is used according to this invention contains at least one vinyl group attached to a hydrocarbon radical containing one or more carbon atoms. Preferably, it is an aliphatic conjugated diolefin containing 4 to 8 carbon atoms. Examples of such hydrocarbon monomers are butadiene-1,3, isoprene, pentadiene-1,3, hexadiene-1,3, 2,3-dimethyl butadiene-1,3 or a mixture thereof.

The hydrocarbon monomer as described above is polymerized in the presence of a Ziegler type catalyst which is capable of directing the polymerization of monomer units to a specific steric configuration in the polymer. Such polymerization is generally known as a stereospecific polymerization and the catalyst used in the process is a stereospecific catalyst. The resulting polymers are stereoregular, since the majority, preferably at least 85%, of the monomeric units are in the same steric configuration. Examples of stereoregular polymers are isotactic polypropylene, syndiotactic polypropylene, cis-1,4 polyisoprene, cis-1,4 polybutadiene, 1,2-polybutadiene, trans-1,4 polymers of conjugated aliphatic diolefins. Because of the structural regularity these polymers are crystalline or crystallize more readily than their less regular counterparts.

A large number of stereospecific catalysts is known, but only those can be used in this invention which are based on a hydrocarbyl aluminum compound such as a trialkyl aluminum. The aluminum compound is free of halogen and has at least one and preferably two or three hydrocarbyl groups attached to the aluminum atom through a carbon atom. It may be generally represented by the formula $RalX_2$ in which X is R, H or OR and R is a hydrocarbyl group containing 2 to 12 carbon atoms. The preferred aluminum compound, however, is a trialkyl aluminum such as triethyl aluminum, tri-n-butyl aluminum, or tri-isobutyl aluminum.

The second essential component of the stereospecific catalyst is a compound of a heavy metal of Group IV–B to VI–B of the Periodic Table. The Periodic Table used in this specification is as shown in "Handbook of Chemistry and Physics," 39th edition, Chemical Rubber Publishing Co., Cleveland, Ohio, at pages 400 and 401. This compound of heavy metal may be a halide, complex halide, oxyhalide, alkoxide, carboxylate or an enolate such as diketonate; it may be either hydrocarbon soluble or insoluble compound. The compounds that are insoluble in hydrocarbons are preferred if a high stereoregularity is desired. Such compounds, however, may be solubilized on reaction with either aluminum compounds or aluminum compounds and polar additives. Representative examples of the heavy metal compounds are $TiCl_4$, $Ti(OR)_4$, $TiCl_3$, $TiI_4$, $TiCl_3I$, $VCl_3$, $VCl_4$, $VOCl_3$, $VO(OR)_3$, $VCl_3 \cdot nY$, VCl₄.nY, VOCl₃.nY, or mixtures thereof, where R is a hydrocarbyl radical containing 1–12 carbon atoms, $n$ is 1–3 and Y is an organic polar compound such as alcohol, glycol, mono- or dibasic carboxylic acid, enolizable carbonyl, ether or amine. Vanadium compounds are preferred in the polymerization of conjugated diolefin to a high trans-1,4 polymer.

The molar proportion of the catalyst components may vary within a wide range from about 1:1 to 50:1 of the aluminum compound to the heavy metal compound, although for the preparation of trans-1,4 polymers it is preferred to use a catalyst containing 1–25 moles of the aluminum compound per mole of vanadium.

The above catalyst components may be admixed in any desired order and then added to the reaction vessel or they may be mixed in the presence of monomer, diluent and optionally the modifier. The total amount of catalyst required to effect polymerization may be readily determined by those skilled in the art and depends on factors such as temperature of polymerization, impurities present in the monomer and diluent. The practical range of the total catalyst is from about 0.1 to about 5 percent by weight of monomer.

The halogen substituted diolefin containing 4 to 12 carbon atoms used in accordance with this invention is another essential component of the system; it acts as a modifier of the molecular weight of the polymer. It is an aliphatic conjugated diolefin having a halogen substituent attached to a non-terminal unsaturated carbon atom. This carbon atom is hydrogen free and may be represented by the —C(X)= group as in the general formula for haloprene

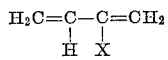

in which X is chlorine, bromine or iodine. Halogenated compounds in which the halogen atom is attached to an olefinic carbon atom also carrying a hydrogen are not suitable. The preferred halogen is chlorine and the preferred halogenated diolefin is chloroprene, although other chlorine substituted diolefins such as 2-chloro-1,3 pentadiene or 2-chloro-2,4 hexadiene are also suitable. Bromine substituted diolefins such as bromoprene may also be used.

The amount of the halogen substituted diolefin that may be used in accordance with this invention depends on the type of monomer, stereospecific catalyst and the degree of modification required. This amount is small in proportion to the monomer, less than 2 moles, for example in the range from 0.01 to 1.0 mole, per 100 moles of hydrocarbon monomer. In the production of trans-1,4 polymers of conjugated diolefins, 0.1 to 0.6 mole of chloroprene per 100 moles of the diolefin is effective in depressing the molecular weight to a level as desired for satisfactory handling on rubber processing equipment. This amount of the halogen substituted diolefin present in the polymerization mixture is, on a molar basis, less than the sum of the aluminum compound and the heavy metal compound. Preferably it is less than the amount of the aluminum compound. If desired, the modifier of this invention may be used in combination with other conventional modifiers such as hydrogen.

The molecular weight of high polymers may be measured by different methods and expressed in different practical units such as Mooney viscosity, melt flow index, Defo plasticity, etc. In this invention, the molecular weight of resulting polymers is expressed in terms of the intrinsic viscosity which is measured at 30° C. on a small sample of polymer dissolved in toluene. It represents a value obtained by dividing the natural logarithm of the relative viscosity of dilute solution, relative to that of solvent, by the concentration of polymer in the solution and extrapolating it to infinite dilution. The intrinsic viscosity may vary within wide limits, but should be controlled at less than 10 deciliter/gram, as desired for a particular use. In adhesives, a low molecular weight corresponding to the intrinsic viscosity of 0.5–3 deciliter/gram is preferred. Molecular weights of above 5 dl./g. on the other hand, are desired, where strength of the final product rather than the processing facility is important. In case of trans-1,4 polymer of conjugated diolefin, e.g. trans-1,4 polyisoprene, an intrinsic viscosity between 0.5 and 5.0 deciliter/gram is particularly useful in applications such as golf ball covers, hot melt adhesives, mouldable and remouldable compositions.

The polymerization is carried out in a liquid medium at temperatures ranging from about —25° C. to +120° C., preferably 20–80° C., and at pressures ranging from about 1 to 5 atmospheres. The monomer or monomers may be dispersed in an inert liquid diluent medium, although the monomer itself can act as the liquid diluent in which case the conversion of monomer to polymer must be controlled to maintain a fluid system. Such diluents include aliphatic, cycloaliphatic and aromatic hydrocarbons such as butane, butene, pentane, hexane, cyclohexane, octane, isooctane, benzene, toluene, xylene or mixtures thereof. The amount and composition of the diluent is selected with a view that the product of polymerization is sufficiently fluid for mixing and pumping. The proportion of diluent to monomer may range from 1:1 to 50:1, preferably 3:1 to 20:1, on a weight basis.

The invention is further described in detail in the following examples in which isoprene was polymerized in the presence of stereospecific catalyst and variable amount of chloroprene. The isoprene was pure grade, substantially free of acetylenes and cyclopentadiene and had a minimum purity of 99.4% and dried by passing over alumina and then over molecular sieves. The benzene used as a diluent was thiophene-free and dried by azeotropic distillation. The chloroprene was freshly prepared from vinyl acetylene and used as a 40 percent by weight solution in toluene. Triethyl aluminum was dissolved in hexane to form a one-molar solution which was used in Example I or was used as received in the form of a 20 percent by weight solution in benzene as in Example II. Vanadium trichloride was dispersed in benzene and ground in the presence of stainless steel balls on a paint mill to produce a ¼ molar dispersion. The experiments were carried out in crown capped pressure bottles which had previously been thoroughly dried at 105° C. in an oven, then rinsed with a 2% solution of triethyl aluminum, followed with dry solvent and flushed with dry nitrogen. The bottles, filled with nitrogen, were capped and the reaction components charged by volume using a hypodermic needle inserted through a self-sealing rubber gasket.

EXAMPLE I

Isoprene was polymerized in 7 oz. crown capped glass bottles using the following recipe:

Benzene—100 milliliters
VCl₃—3 millimoles
AlEt₃—3.5 millimoles
Isoprene—30 milliliters
Chloroprene as 40% solution—Variable Two bottles were charged with the above ingredients added in the order as shown above. Chloroprene was added immediately after isoprene and then the bottles were re-capped, placed in a water bath maintained at 50° C. and rotated slowly end-over-end. After 16 hours of rotating, the reaction was stopped by the injection of about 5 milliliters of ethanol. The product was then transferred to a separate flask, precipitated with excess of ethanol, extracted with boiling ethanol containing 1% of 2,6-ditertiary butyl 4-methyl phenol and dried under vacuum at 50° C. for about 16 hours. The dry polymers were analyzed for structure using known X-ray diffraction and infrared absorption methods, and for molecular weight using dilute solution viscosity method.

The results are presented in Table I.

TABLE I

| Bottle No. | Chloroprene (millimoles) | Intrinsic viscosity (dl./g.) |
|---|---|---|
| 1 (control) | Nil | 4.34 |
| 2 | 0.6 | 3.22 |

Both polymers showed a high crystallinity of about 28% of the trans-1,4 polyisoprene type and a trans-1,4 content of about 95%.

EXAMPLE II

Isoprene was polymerized in 1 liter crown capped glass bottles in the presence of chloroprene. The following polymerization recipe was used:

Benzene—500 milliliters
Isoprene—50 milliliters
$AlEt_3$—3.0 millimoles
$VCl_4$—1.25 millimoles
$TiCl_4$—0.125 millimole
Chloroprene as 26.6% solution in toluene—0.6 millimole Two bottles were charged using the procedure as described in Example I. The bottles were placed in a bath maintained at 30° C. and rotated for 16 hours.

The polymers were recovered and analyzed in the manner described in Example I. Experimental results are shown in Table II.

TABLE II

| Bottle No. | Conversion percent of monomer) | Intrinsic viscosity (dl./g.) | X-ray crystallinity (percent) |
|---|---|---|---|
| 1 (control) | 41 | 8.0 | 25.6 |
| 2 (with chloroprene) | 28 | 5.0 | 25.3 |

The crystallinity of both polymers was identical with that of natural Balata. Bottle 2 showed that as little as 0.6 millimole of chloroprene per 34 grams of isoprene i.e. 1.2 mole/1000 mole of isoprene was sufficient to reduce the molecular weight of polyisoprene from the intrinsic viscosity of 8 dl./gt. to 5 dl./g.

What is claimed is:

1. A process for polymerizing a conjugated diolefin containing 4 to 8 carbon atoms to produce a stereoregular polymer having a molecular weight of less than 10 deciliter/gram, measured at 30° C. in toluene, which comprises contacting said diolefin with a catalyst comprising a hydrocarbyl aluminum compound and a compound of vanadium in the presence of from 0.01 to 1.0 mole, per 100 moles of said diolefin, of a halogen-substituted diolefin containing 4–12 carbon atoms.

2. The process according to claim 1 in which the conjugated diolefin is selected from the group consisting of butadiene and isoprene.

3. The process according to claim 1 in which the hydrocarbyl aluminum compound is a trialkyl aluminum.

4. The process according to claim 1 in which the halogen-substituted diolefin is an aliphatic conjugated diolefin having a halogen substituent attached to a nonterminal olefinically unsaturated carbon atom.

5. The process according to claim 4 in which the halogen-substituted diolefin is chloroprene.

6. The process according to claim 2 in which the stereoregular polymer of the aliphatic conjugated diolefin has a molecular weight corresponding to an intrinsic viscosity from about 0.5 to 5.0 deciliters per gram measured at 30° C. in toluene.

7. A catalyst for the polymerization of a conjugated diolefin containing 4–8 carbon atoms to produce a stereoregular polymer of a controlled molecular weight which comprises a mixture of a hydrocarbyl aluminum compound and a compound of vanadium with a halogen-substituted diolefin containing 4–12 carbon atoms, the molar ratio of aluminum to the heavy metal being from 1:1 to 50:1, the molar ratio of said halogen-substituted diolefin to said aluminum compound being less than 1:1.

8. The catalyst according to claim 7 in which the hydrocarbyl aluminum is a trialkyl aluminum.

9. The catalyst according to claim 7 in which the halogen-substituted diolefin is chloroprene.

References Cited

UNITED STATES PATENTS

| 3,177,183 | 4/1965 | Naylor et al. | 260—82.1 |
| 3,196,143 | 7/1965 | Stewart et al. | 260—94.3 |
| 3,268,500 | 8/1966 | Royston | 260—94.3 |
| 3,435,011 | 3/1969 | Uranek et tal. | 260—80.7 |

FOREIGN PATENTS

| 992,210 | 5/1965 | Great Britain | 260—94.7 |

JOSEPH L. SCHOFER, Primary Examiner

R. A. GAITHER, Assistant Examiner

U.S. Cl. X.R.

252—429; 260—82.1, 93.7